3,238,208
CERTAIN 5-ANILINOURACILS
Fred R. Gerns and George H. Hitchings, Yonkers, N.Y., assignors to Burroughs Wellcome & Co. (U.S.A.) Inc., Tuckahoe, N.Y., a corporation of New York
No Drawing. Filed Feb. 27, 1962, Ser. No. 176,092
3 Claims. (Cl. 260—256.4)

The present application relates to a novel group of 5-anilinouracils represented by the Formula I

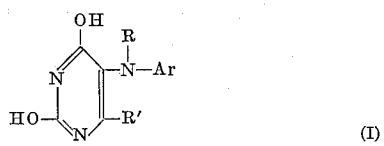

wherein R and R' are hydrogen or lower alkyl and Ar is an aromatic radical. These compounds are prepared from the appropriate 5-bromouracil by reaction with the aniline derivative in a suitable solvent, usually a high-boiling alcohol such as ethylene glycol.

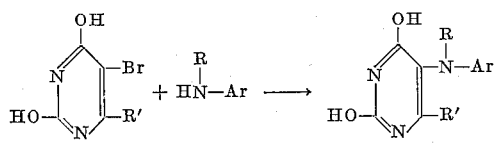

The 5-bromouracils are not very reactive and require temperatures of 190–200° for the reaction to be accomplished in a convenient time. However, an hydroxylic solvent also seems desirable (e.g., dimethylformamide is unsuitable). In practice therefore, the reaction must be run in a glycol, conveniently ethylene glycol though propylene glycol may also be employed. During the heating, it is desirable to preserve an inert atmosphere by sweeping out with nitrogen (or argon or helium). This is not absolutely necessary but if oxygen be present a certain amount of oxidation ensues resulting in tarry material that complicates the purification of the product.

Operation under Banks conditions (with catalysis by strong acid) is unsuccessful in this situation.

The bromouracil can be replaced by a 5-chlorouracil but this is less convenient and offers no advantages.

The compounds I are useful as intermediates in the preparation of 2,4-diamino-5-anilinopyrimidines (II) according to the sequence:

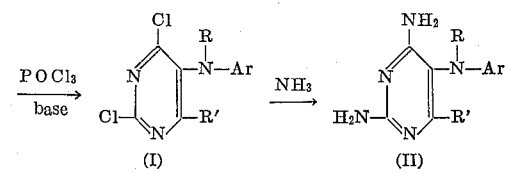

The latter compounds (II), are useful as anti-malarial drugs and as bactericides. The compounds (e.g., 5-anilinouracil and 5-m-toluidinouracil) also have the ability to suppress the immune response in experimental animals. They are, therefore, of potential value in connection with surgical transplants.

In general, the 5-anilinouracils melt at rather high temperatures, probably with decomposition. As a result, their "melting points" are of little value for characterization. In the following examples principal reliance for characterization is placed in ultraviolet absorption spectra. Temperatures given are in the centigrade scale.

*Example 1.—Preparation of 5-anilinouracil*

A solution of 250 g. (1.3 mole) of 5-bromouracil and 363 g. (3.9 mole) of aniline in 3 liters of ethylene glycol was refluxed for two hours at 190–195° in a nitrogen atmosphere. After standing overnight at room temperature, the reaction mixture was diluted with a large volume of water and refrigerated. The product was collected by suction filtration, washed with water and acetone, and dried. Thus was obtained 196 g. of the free base in the form of pink needles. The product was further purified by solution in aqueous base, followed by treatment with charcoal and reprecipitation with concentrated hydrochloric acid. Several recrystallizations from glacial acetic acid gave the product as the free base consisting of white needles of indefinite melting point, decomposing above 300°.

The compounds (listed in the following table) were prepared by the same method from the appropriately substituted aniline and 5-bromouracil. The ultraviolet spectral characteristics are given in m$\mu$.

| Substituent on Benzene Ring | pH 1 | | | | pH 13 | | | |
|---|---|---|---|---|---|---|---|---|
| | $\lambda$ max | $\epsilon$ | $\lambda$ min | $\epsilon$ | $\lambda$ max | $\epsilon$ | $\lambda$ min | $\epsilon$ |
| | 240 | 11,600 | 222 | 9,500 | 235 / *280 | 11,600 / 6,300 | | |
| 2'-CH₃ | 235 | 13,000 | 222 | 12,100 | 232 / 282 | 11,300 / 6,500 | 270 | 6,400 |
| 3'-CH₃ | 241 | 12,300 | 224 | 10,600 | 239 / 282 | 11,000 / 7,060 | 231 / 276 | 10,800 / 6,950 |
| 4'-CH₃ | 244 | 11,700 | 224 | 9,550 | 234 / *280 | 11,100 / 5,400 | | |
| 3'-Br | 247 | 13,000 | 233 | 11,600 | 246 / 288.5 | 11,400 / 7,600 | 237.5 / 275 | 10,800 / 7,100 |
| 4'-F | 234 | 10,600 | 222 | 10,000 | 228 / 288 | 9,700 / 5,400 | 269 | 4,800 |
| 4'-OCH₃ | 242 | 10,000 | 232 | 9,700 | 232 / 289 | 13,000 / 5,700 | 277 | 5,500 |
| 4'-C₆H₅ | 247 | 18,700 | 223 | 8,500 | 273 | 18,600 | 230 | 3,350 |
| 2',4'-di-OCH₃ | 244 | 10,300 | 235 | 10,000 | *235 / 288 | 10,900 / 5,660 | 273 | 5,100 |
| 3',4',5'-tri-OCH₃ | 244 | 12,700 | 237 | 12,600 | *245 / *285 | 12,100 / 6,600 | | |

*Shoulder.

*Example 2.—Preparation of 5-(2'-chloroanilino)uracil*

A solution of 10 g. (0.052 mole) of 5-bromouracil and 40 g. of o-chloroaniline in 150 ml. of ethylene glycol was refluxed for three and one-half hours under nitrogen. The product which settled out on cooling was collected and washed with water and acetone. Additional product was obtained from the mother liquor as follows: it was made strongly basic with potassium hydroxide, excess aniline removed by extraction with ether. On acidification of the aqueous solution with acetic acid or concentrated hydrochloric acid, the product precipitated out as the free base. The product fractions were combined and purified by solution in aqueous base, followed by treatment with charcoal and reprecipitation with concentrated hydrochloric acid. Several recrystallizations from glacial acetic acid with the aid of charcoal gave the product base as white needles decomposing above 300°.

The compounds listed in the following table were prepared by the same method from the appropriately substituted aniline and 5-bromouracil. With the exception of the 2'- and 4'-chloro derivatives, reflux time was limited to two hours. The ultraviolet spectral characteristics are given in mμ.

acid. Several recrystallizations from aqueous methoxyethanol gave the product as the free base in the form of white microneedles.

The compounds (listed in the following table) were prepared by the same method from the appropriate N-alkylaniline and 5-bromouracil. The ultraviolet spectral characteristics are in mμ.

| 5-Substituent | pH 1 | | | | pH 13 | | | |
|---|---|---|---|---|---|---|---|---|
| | λ max | ε | λ min | ε | λ max | ε | λ min | ε |
| N-methylanilino | 245 | 17,100 | 222.5 | 12,300 | 251 / 285 | 14,600 / 8,000 | 228 / 280 | 9,300 / 7,800 |
| N-ethylanilino | 249.5 | 17,800 | 224 | 10,400 | 253 / *285 | 15,400 / 8,400 | 230 | 8,700 |
| N-methyl-o-toluidino | 249 / *315 | 11,900 / 4,000 | 231 | 11,100 | 257 / *290 | 12,500 / 6,900 | 236 | 9,700 |

*Shoulder.

| Substituent on Benzene Ring | pH 1 | | | | pH 13 | | | |
|---|---|---|---|---|---|---|---|---|
| | λ max | ε | λ min | ε | λ max | ε | λ min | ε |
| 2'-Cl | 240 | 13,000 | 227 | 11,100 | 240 / 289 | 12,100 / 7,500 | 230 / 271 | 11,200 / 6,300 |
| 3'-Cl | 244 | 12,400 | 230 | 10,900 | 245 / 289 | 10,700 / 6,500 | 231 / 273 | 9,700 / 5,950 |
| 4'-Cl | 248 | 9,500 | 227 | 6,300 | 242 / *290 | 12,100 / 5,000 | | |
| 3', 4'-di-Cl | 250 | 13,300 | 233 | 10,300 | 250 / *290 | 12,400 / 6,300 | 232 | 9,650 |

*Shoulder.

*Example 3.—Preparation of 5-N-methylanilinouracil*

A solution of 50 g. (0.26 mole) of 5-bromouracil and 100 g. (0.93 mole) of N-methylaniline in 650 ml. of ethylene glycol was refluxed for five hours in a nitrogen atmosphere. After standing for two days the reaction mixture was diluted with one volume of water and made alkaline with pellets of potassium hydroxide. The aqueous solution was extracted with ether to remove excess aniline, then acidified with 6 N hydrochloric acid. The white product which precipitated was collected by suction filtration, washed with water and a little acetone, and dried. For further purification the product was redissolved in aqueous base, treated with charcoal, and reprecipitated with

*Example 4.—Preparation of 5-(p-toluidino)-6-methyluracil*

A solution of 15 g. (0.073 mole) of 5-bromo-6-methyluracil and 100 g. of p-toluidine in 200 ml. of ethylene glycol was heated at 195° for two hours under nitrogen. The cooled solution was made strongly alkaline with potassium hydroxide pellets and the excess toluidine taken up in ether. The aqueous solution was extracted three times with ether and acidified with acetic acid. The product was collected, redissolved in alkali, treated with charcoal and reprecipitated by acidification. The pure product was obtained by repeated recrystallizations from glacial acetic acid. No definite melting point was noted, decomposition occurring above 300°.

The compounds listed in the following table were prepared by the same method from the appropriately substituted aniline and 5-bromo-6-methyluracil. The ultraviolet spectral characteristics are given in mμ.

| Substituent on Benzene Ring | pH 1 | | | | pH 13 | | | |
|---|---|---|---|---|---|---|---|---|
| | λ max | ε | λ min | ε | λ max | ε | λ min | ε |
| | 242 | 15,200 | 222.5 | 9,300 | 244 / 285 | 14,700 / 7,400 | 225 / 275 | 10,800 / 6,950 |
| 2'-CH₃ | 241 | 16,000 | 222.5 | 10,600 | 242 / 283 | 14,700 / 8,450 | 227 / 270 | 11,200 / 7,750 |
| 3'-CH₃ | 245 | 15,600 | 225 | 10,900 | 246.5 / 285 | 14,500 / 7,600 | 230 / 275 | 10,900 / 7,200 |
| 4'-CH₃ | 245 | 15,800 | 223 | 9,550 | 244 / 283.5 | 14,800 / 6,800 | 278 | 6,600 |
| 3'-Cl | 246.5 | 18,000 | 228 | 11,100 | 250 / 288 | 15,100 / 8,100 | 232 / 276 | 9,700 / 7,550 |
| 4'-Cl | 251 / *295 | 20,000 / 4,300 | 224 | 7,000 | 253.5 / *285 | 18,000 / 8,000 | 227 | 10,300 |
| 4'-OCH₃ | 239.5 / *300 | 11,000 / 2,500 | 230 | 10,200 | 235 / 290 | 12,300 / 4,800 | 277 | 4,300 |

*Shoulder.

*Example 5.—Preparation of 5-(p-toluidino)-2-thiouracil*

A solution of 10 g. (0.048 mole) of 5-bromo-2-thiouracil and 50 g. of p-toluidine in 40 ml. of ethylene glycol was heated at 210° for two hours under nitrogen. The solution was cooled and diluted with 200 ml. of 3 N hydrochloric acid. After refrigeration for a day the product was collected, washed with water, and dried. Five grams were obtained which were combined with the product of a second run, dissolved in ammonium hydroxide, treated with Darco and acidified with acetic acid. The yellow precipitate was washed with water and a little acetone and recrystallized once from glacial acetic acid and once from aqueous methoxyethanol. The pale yellow product has no definite melting point.

The following compounds were prepared by the same method from the appropriately substituted aniline and 5-bromo-2-thiouracil. The ultraviolet spectral characteristics are given in m$\mu$.

| Substituent on Benzene Ring | pH 1 | | | | pH 13 | | | |
|---|---|---|---|---|---|---|---|---|
| | $\lambda$ max | $\epsilon$ | $\lambda$ min | $\epsilon$ | $\lambda$ max | $\epsilon$ | $\lambda$ min | $\epsilon$ |
| ---------- | 232.5 | 14,900 | 224 | 14,000 | 290 | 13,200 | 256.5 | 10,800 |
| | 312 | 16,000 | 271 | 5,950 | | | | |
| 2'-CH$_3$ | 231 | 13,000 | 225 | 12,700 | 287 | 12,800 | 255 | 10,100 |
| | 310 | 15,600 | 260 | 5,500 | | | | |
| 3'-CH$_3$ | 233 | 14,100 | 225 | 13,500 | 290 | 12,600 | 256 | 10,600 |
| | 314 | 14,700 | 262.5 | 6,200 | | | | |
| 4'-CH$_3$ | 232.5 | 15,400 | 225 | 15,200 | 297 | 14,300 | 262 | 10,000 |
| | 313 | 15,900 | 263 | 6,300 | | | | |
| 4'-Cl | 233.5 | 16,100 | 227 | 15,700 | 293 | 13,500 | 278 | 13,100 |
| | 310 | 16,800 | 265 | 7,850 | | | | |
| | *340 | 14,850 | | | | | | |
| 4'-OCH$_3$ | *235 | 17,000 | 263 | 6,750 | 294 | 13,600 | 258 | 11,000 |
| | 312.5 | 17,100 | | | | | | |

*Shoulder.

*Example 6.—Preparation of 2,4-dichloro-5-anilinopyrimidine*

A mixture of 25.7 g. (0.12 mole) of 5-anilinouracil and 17.9 g. (0.12 mole) of N,N-diethylaniline in 250 ml. of phosphoryl chloride was heated for three and one-half hours under reflux. Most of the phosphoryl chloride was removed by distillation under diminished pressure and the residue poured into ice water with stirring. The aqueous mixture was brought to pH 5–6 by the addition of solid sodium carbonate and extracted with ether three times. The ether extracts were combined and dried. The residue obtained after removal of the ether was triturated repeatedly with boiling n-hexane. A high-melting solid which settled out on cooling the hexane solution to room temperature was collected and discarded. The hexane solution was concentrated until it became turbid. On cooling, the product crystallized out. Additional product was obtained by concentration of the mother liquor. An analytical sample was obtained by recrystallization from n-hexane. It melted at 95–97°.

*Example 7.—Preparation of 2,4-diamino-5-anilinopyrimidine*

Four grams of 2,4-dichloro-5-anilinopyrimidine was heated in a sealed vessel with alcoholic ammonia. After seventeen hours at 145°, the vessel was cooled and the alcoholic solution concentrated to dryness. The residue was taken up in dilute acetic acid, filtered, and made basic with ammonium hydroxide. The product was collected by filtration and recrystallized with benzene containing a little methanol. It melted at 200–202°.

What we claim is:
1. 5-anilino-6-lower alkyl uracil.
2. 5-(N-lower-alkylanilino)uracil.
3. 5-(N-lower-alkylanilino)-6-lower alkyl uracil.

References Cited by the Examiner

Burger, Medicinal Chemistry (New York, 1960), pages 36–45 and 75–77.
Chem. Abstracts, vol. 39, pages 5956–5972 (1945).
Chem. Abstracts (Subject Index), vol. 45, page 12,541 (1951).
Elderfield, Heterocyclic Compounds, vol. 16 (New York, 1957), pages 302–303, 306–308.
Phillips, J. Am. Chem. Soc., vol. 73, p. 1061 (1951).

IRVING MARCUS, *Primary Examiner.*

DUVAL T. McCUTCHEN, WALTER A. MODANCE, NICHOLAS S. RIZZO, *Examiners.*